United States Patent [19]

Culver

[11] Patent Number: 4,464,546
[45] Date of Patent: Aug. 7, 1984

[54] POWER COLLECTION APPARATUS FOR A VEHICLE

[75] Inventor: Frank R. Culver, McMurray, Pa.

[73] Assignee: Westinghouse Electric Corp., Pittsburgh, Pa.

[21] Appl. No.: 324,296

[22] Filed: Nov. 23, 1981

[51] Int. Cl.³ .......................... B60L 5/36; B60L 5/39
[52] U.S. Cl. ...................................... 191/49; 191/60.4
[58] Field of Search ................. 191/32, 49, 57, 59.1, 191/59, 60.4, 45 R

[56] References Cited

U.S. PATENT DOCUMENTS

| | | |
|---|---|---|
| 605,326 | 6/1898 | McGlaughlin ................. 191/60.4 |
| 3,312,180 | 4/1967 | Mueller . |
| 3,656,038 | 4/1972 | Ries et al. . |
| 3,672,308 | 6/1972 | Segar . |
| 3,697,845 | 10/1972 | Soffer et al. . |
| 3,769,566 | 10/1973 | Mehta . |
| 3,786,204 | 1/1974 | Laurent ........................ 191/49 X |
| 3,811,080 | 5/1974 | Morton et al. . |
| 3,866,098 | 2/1975 | Weiser . |
| 3,880,264 | 4/1975 | Corkum ............................ 191/49 |
| 3,906,317 | 9/1975 | Narita . |
| 4,019,108 | 4/1977 | Elvin . |
| 4,027,214 | 5/1977 | Klimo . |
| 4,035,704 | 7/1977 | York . |
| 4,043,436 | 8/1977 | Segar et al. . |
| 4,090,452 | 5/1978 | Segar . |
| 4,095,153 | 6/1978 | Matty et al. . |
| 4,096,423 | 6/1978 | Bailey et al. . |
| 4,155,434 | 5/1979 | Howell, Jr. ..................... 191/49 X |
| 4,168,770 | 9/1979 | Segar et al. . |

FOREIGN PATENT DOCUMENTS

| | | |
|---|---|---|
| 142954 | 7/1980 | German Democratic Rep. .... 191/49 |
| 1522602 | 8/1978 | United Kingdom ................ 191/49 |
| 703375 | 12/1979 | U.S.S.R. .............................. 191/49 |

OTHER PUBLICATIONS

"Westinghouse Engineer", Walker et al., Jul. 1965, pp. 98-103, Transit Expressway . . . .
"Westinghouse Engineer", Jan. 1969, pp. 9-15, Passenger Transfer System . . . .
"Westinghouse Engineer", Mason, Jan. 1971, pp. 8-14; Automated Transit System . . . .
Conference Record, 28th IEEE Vehicular Technology Group, Denver, Col. 3-22-78, Selis.

Primary Examiner—Robert B. Reeves
Assistant Examiner—David F. Hubbuch
Attorney, Agent, or Firm—R. G. Brodahl

[57] ABSTRACT

A transportation vehicle power collector apparatus is operative with a power rail having position changes and misalignments in relation to that vehicle travel path and includes a power collector shoe movable in each of three cartesion coordinates to maintain electrical contact with the power rail.

4 Claims, 10 Drawing Figures

POWER COLLECTION APPARATUS FOR A VEHICLE

BACKGROUND OF THE INVENTION

It is known to provide a transportation vehicle which traverses a roadway as shown in U.S. Pat. No. 3,312,180, where guide wheels depend below the vehicle and engage a guide beam supported between and extending parallel to spaced vehicle support tracks. Electric power has been supplied to the vehicle through suitable power collectors operative with power supply rails mounted parallel to the guide beam and extending along the roadway tracks. It is known to support each collector shoe by a parallelogram arrangement carried by the vehicle as it moves along the roadway with a spring member providing desired contact pressure for the collector shoe against the associated power rail as shown in U.S. Pat. No. 4,168,770.

SUMMARY OF THE INVENTION

A power collection apparatus is provided for operation with a vehicle moving along a roadway track at speeds up to 60 miles per hour such that an improved coupling is established between a current collector member carried by the vehicle and a power supply rail extending in parallel along the track. A reduced impact problem is provided in relation to irregularities, variations and particularly joints in the power rail configuration and profile. The collector member is enabled to move in three perpendicular axes with six degrees of freedom, with the collector member being operative in a dragging mode as compared with a forced pushing mode of operation as provided by the prior art power collection apparatus.

PREFERRED EMBODIMENT OF THE PRESENT INVENTION

Figure 1:
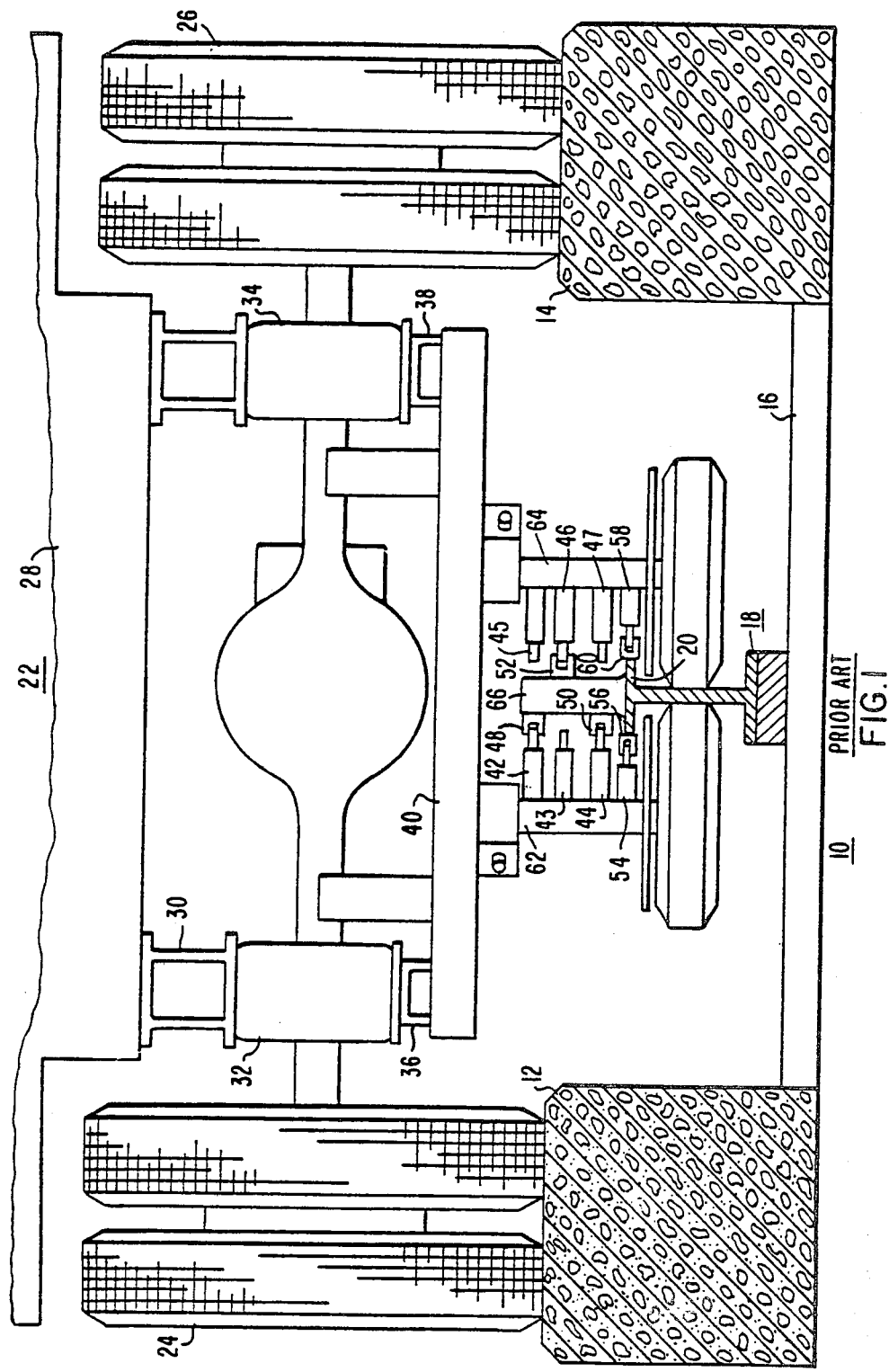
FIG. 1 shows a cross-sectional view of a vehicle and roadway track including a prior art three-phase power collection apparatus.

FIG. 1 is a cross-sectional view of a prior art transportation system power collection apparatus taken along the longitudinal axis of the roadway. The roadway 10 is comprised of laterally spaced concrete tracks 12 and 14 supported from a road bed 16 and includes a flanged guide beam 18 located between the tracks 12 and 14. The guide beam 18 has an upper flange 20. A transportation vehicle 22 has a pair of resilient and laterally spaced main wheels 24 and 26 running on the tracks 12 and 14, respectively. The vehicle 22 is provided with at least two such pairs of resilient and laterally spaced wheels fixed longitudinally along the vehicle. The vehicle 22 is provided with a body 28 mounted on a longitudinal frame 30 resiliently supported by air springs 32 and 34 mounted on channel members 36 and 38 on the vehicle frame 40. The vehicle 22 is powered by an electric propulsion motor coupled through an axle connecting the wheels 24 and 26.

For supplying electric power and control signals to the vehicle 22, power collector shoes 42, 44 and 46 are provided in contact with power rails 48, 50 and 52, respectively. In addition, a ground collector shoe 54 is in contact with a ground rail 56, and control signal collector shoe 58 is in contact with control signal rail 60. The collector shoes 42, 43 and 44 are carried by a support member 62 fastened to the vehicle frame 40. The collector shoes 45, 46 and 47 are carried by support member 64 fastened to vehicle 40. The power rails 48, 50 and 52 and the ground rail 56 and the signal rail 60 are insulatively supported by mounting bracket 66 attached at predetermined longitudinal intervals in the order of every five feet to the upper flange 20 of the guide beam 18. Because the guide beam 18 is positioned within a closer tolerance than are the roadway surfaces and because the vehicle 22 is actually steered by the guide beam 18 and not the roadway surfaces of the respective tracks 12 and 14, the arrangement mounting the power rails 48, 50 and 52 and the ground rail 56 and signal rail 60 to the guide beam 18 provides a more accurate and convenient alignment between the respective rails and the collector shoes 42, 44, 46, 54 and 58.

In the actual operation of the power collection apparatus shown in FIG. 1, it has been found that the alignment tolerances of the power rails and the joints of the power rails where they are joined can become a problem in relation to impact of the collector shoes crossing a joint between power rail sections. This is particularly true for vehicles operating at high speeds up to 60 miles per hour when crossing such joints between respective lengths of power rail sections.

Figure 2:
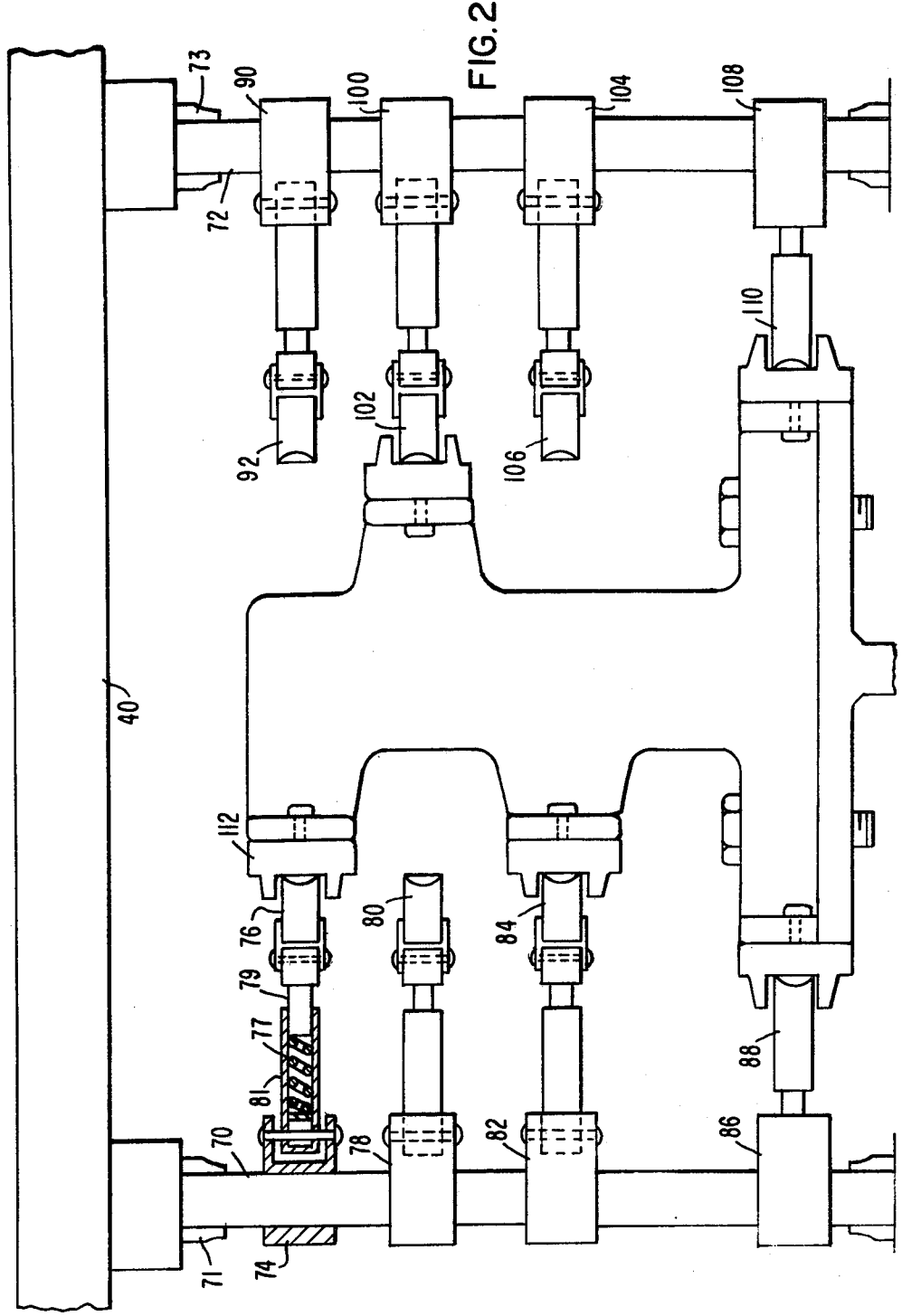
FIG. 2 shows a cross-sectional view of the present three-phase power collection apparatus.

FIG. 2 shows a cross-sectional view of the present three-phase power collection apparatus which allows for more variation in the power rail configurations and profile since the mechanism is capable of moving in the three principal perpendicular axes with six degrees of freedom, with movement in both directions along each axis being provided.

In FIG. 2 there is shown the present three-phase power collection apparatus including a support column 70 fastened to the vehicle frame 40 by a connector 71 and a parallel support column 72 fastened to the vehicle frame 40 by a support collar 73. The support column 70 carries collar member 74 with the associated collector shoe 76, the collar member 78 with the associated collector shoe 80, the collar member 82 with the associated collector shoe 84 and the collar member 86 with the ground collector shoe 88. The support column 72 similarly supports a collar member 90 with its associated collector shoe 92, a collar member 100 with its associated collector shoe 102, a collar member 104 with its associated collector shoe 106 and a collar member 108 with its associated collector shoe 110. It is to be understood that the collector shoes 76, 80 and 84 are vertically movable along the support column 70 as required to maintain alignment with the power rail 112, as are the collector shoes 92, 102 and 106 similarly operative. The collector shoe 76 is horizontally movable in relation to column 70 through operation of a compression spring 77 holding a support rod 79 movable within a support sleeve 81 to retain the collector shoe 76 against the power rail 112. The other collector shoes 80, 84, 92, 102 and 106 are similarly operative, as shown in FIG. 2.

Figure 3:
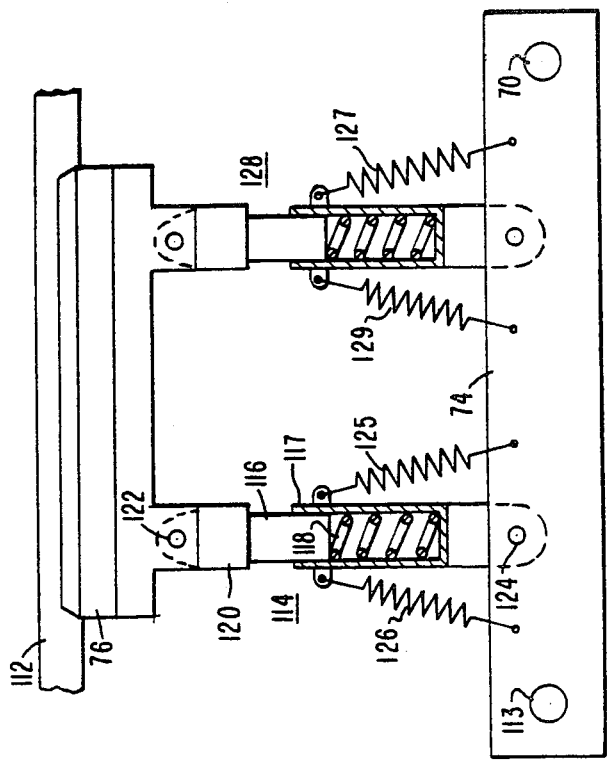
FIG. 3 shows an illustrative top view of one phase of the power collection apparatus in accordance with the present invention.

In FIG. 3 there is shown an illustrative top view of one phase of the power collection apparatus in accordance with the present invention, and including a collector shoe, for example collector shoe 76, and collar member 74 operative with support column 70 and support column 113. The connecting support link 114 includes a support rod or arm 116 slidable within a support sleeve 117 and operative to compress the spring member 118 for determining the position in a horizontal plane of the collector shoe 76 and in a direction toward the power rail 112. A fastener member 120 is connected to the opposite end of the arm 116 and fastened to the collector shoe 76 at a pivot 122. The connection sleeve 117 is fastened to the collar member 74 at a pivot 124, such that the connecting link 114 can pivot around the pin 124 to allow the relatively movement of the collector shoe 76 along the direction of the power rail 112. A position return spring 125 is operative to return the collector shoe 76 to the normal position shown in FIG. 3 if the vehicle 22 should move to the right as shown in FIG. 3. The position return spring 126 is similarly operative with the connecting link 114 to return the collector shoe 76 to the normal position shown in FIG. 3 if the vehicle should move to the left as shown in FIG. 3 and move the collector shoe in a restrained position to the right in relation to the vehicle as the collector shoe slides along the power rail 112 because of friction with the power rail 112. The connecting link 128 is similarly operative as previously explained for the connecting link 114.

Figure 4:
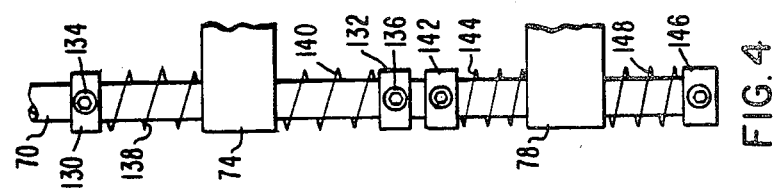
FIG. 4 shows a suitable vertical position adjustment and control apparatus provided for each phase of the present power collection apparatus.

FIG. 4 shows the vertical position adjustment and control apparatus such as is provided for each phase of the present power collection apparatus. The support column 70 is shown with collar members 74 and 78 to illustrate the vertical adjustment of the position of the collar members in relation to the support column 70. The collector shoes 76 and 80 are associated with the respective collar members 74 and 78. If it is desired that the collar member 74 move between the location of a first fastener ring 130 and a second fastener ring 132, then the position of the first fastener ring 130 can be fixed by an Allen screw 134 or similar fastener member and the position of the second fastener ring 132 can be determined by an Allen screw fastener 136. A compression spring 138 is provided between the fastener ring 130 and the collar member 74 and a compression spring 140 is provided between the collar member 74 and the fastener ring 132. The equilibrium or normal position of the collar member 74 determines the vertical position of the collector shoe 76 associated with the collar member 74. Similarly, the vertical position of the collar member 78 is determined by the secured position of the fastener ring 142 operative with the compression spring 144 in relation to the secured position of the fastener ring 146 associated with the compression spring 148.

Figure 5:
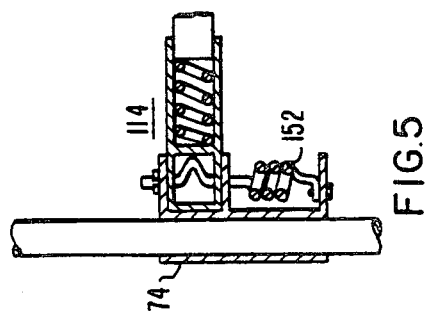
FIG. 5 shows a modification of the horizontal position adjustment and control apparatus provided for each phase in accordance with the present invention.

In FIG. 5 there is shown one modification of the collar member 74, such as shown in FIG. 3. However, instead of the position return springs 125 and 126 provided for the connecting link 114 and the similar position return springs 127 and 129 for the connecting link 128, a helical torsion spring 152 can be fastened to the connecting link member 114 and a similar helical torsion spring can be fastened to connecting link 128 to function for returning the collector shoe 76 associated with the collar member 74 to a normal position such as shown in FIG. 3 where the link members are substantially perpendicular with the associated power rail.

Figure 6:
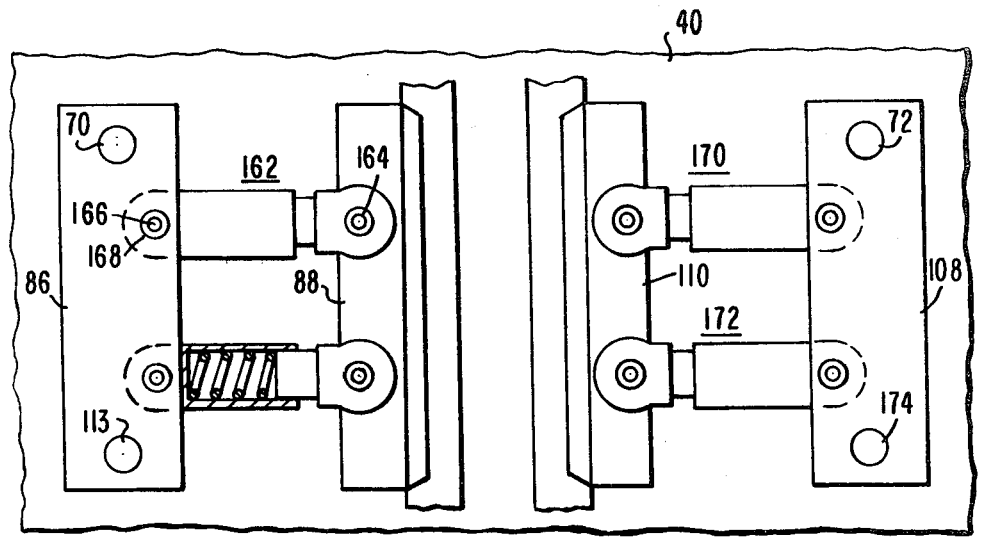
FIG. 6 shows a bottom view of the power collection apparatus shown in FIG. 3.

In FIG. 6 there is shown a bottom view of the power collection apparatus as shown in FIG. 2 with the support columns 70 and 72 being shown, the support column 70 cooperates with a parallel support column 113 in relation to the collar member 86 operative with the ground collector shoe 88 for purposes of illustration. A link member 162 is connected between the collector shoe 88 and the collar member 86 such that a pivot connection 164 enables the collector shoe 88 to move about the one end of the connecting link 162 and a second pivot connection 166 including a helical torsion spring 168 is provided to enable the link member 162 to pivot in relation to the collar member 86. The collar member 108 operative with the control signal collector shoe 110 is also shown with similar link members 170 and 172. A second support column 174 is fastened to the vehicle frame 40 in parallel with support column 72 such that the collar member 108 can move vertically in relation to a perpendicular axis to and away from the vehicle frame 40.

The power collector apparatus of the present invention is enabled to move with six degrees of freedom along three cartesion coordinate axes. For example, movement along an axis substantially parallel with the connecting link 114 and in the horizontal plane of the power rail 112 as shown in FIG. 3, is enabled by the connecting links 114 and 128 to compress and extend as required and as held by the compression spring member 118 to enable the collector shoe 76 to maintain satisfactory electrical contact with the power rail 112 as the power rail is displaced or misaligned in the horizontal plane of the drawing shown in FIG. 3 and substantially perpendicular to the collar member 74. Similarly, the collector shoe 76 is enabled to move to the left and to the right as shown in FIG. 3 and along an axis parallel with the power rail, by action about the pivot connections 122 and 124 shown in relation to the connecting link 114 which permits the collector shoe 76 to maintain a dragging mode whereby if the vehicle and the collar member 74 is moving to the right as shown in FIG. 3, the collector shoe 76 will tend to move to the left in response to the friction between the collector shoe 76 and the power rail 112, such that the collector shoe 76 moves to the right with the vehicle but drags along the power rail 112. On the other hand, if the vehicle should move to the left and the vehicle the collar member 74 would similarly move to the left with the vehicle, the collector shoe 76 would drag along the power rail and in effect move to the right of the position shown in FIG. 3 in relation to the collar member 74 such that the collector shoe 76 would thereby maintain a dragging mode along the power rail 112. The collar member 74 and its associated collector shoe 76 is enabled to move along a third axis substantially perpendicular to the plane of the drawing in FIG. 3, such that should the power rail 112 be displaced or misaligned along this third axis, the collector shoe 76 can move as required to maintain its desired alignment with the power rail 112 and satisfactory electrical connection between the collector shoe 76 and power rail 112. This latter collector shoe movement is accomplished by the collar member 74 moving along the support columns 70 and 113 substantially perpendicular to the plane of the drawing of FIG. 3 as required for the collector shoe 76 to follow any such position changes or variations of the power rail 112.

Figure 7:
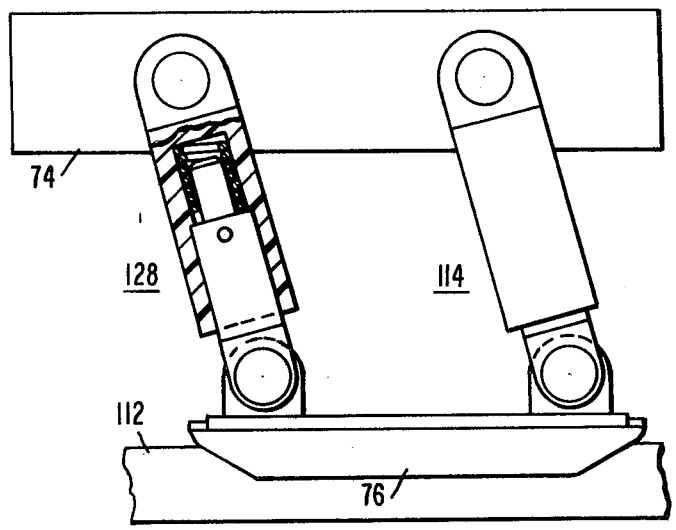
FIG. 7 shows a modified power collector shoe apparatus of the present invention operating in the dragging mode with a vehicle moving to the left as shown in FIG. 7.

In FIG. 7 the collector shoe 76 is shown as it would operate in the dragging mode along a power rail 112 for a vehicle collar member 74 moving to the left as shown in FIG. 7.

Figure 8:
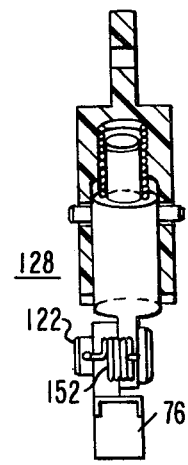
FIG. 8 shows a modified power collector shoe position centering arrangement of the present invention.

FIG. 8 shows a modified arrangement for the helical torsion spring 152 operative with pivot connection 122 for attempting to center the position of the collector shoe 76 from the position as shown in FIG. 7 and into the centered position as shown in FIG. 3.

Figure 9:
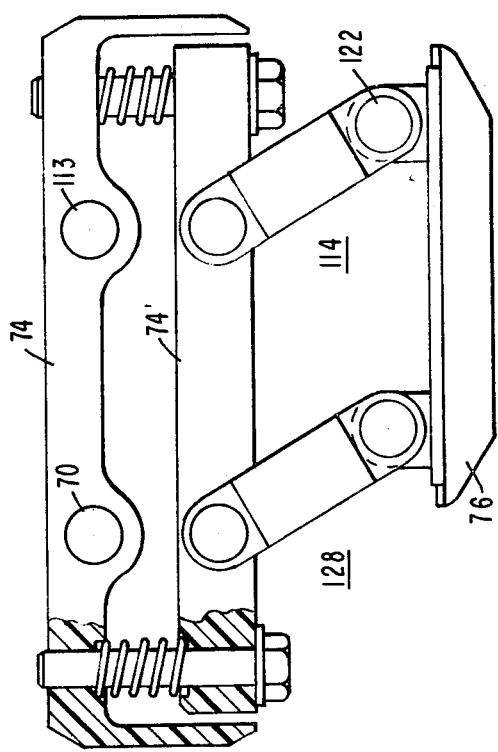
FIG. 9 shows a modification of the apparatus shown in FIG. 3.

FIG. 9 shows a modification of the apparatus shown in FIG. 3, with the collar member 74' including a second support member 74 from which the connecting links 114 and 128 are pivoted.

Figure 10:
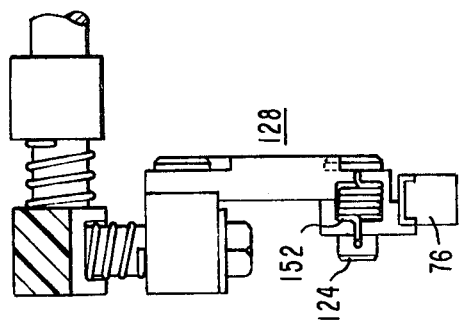
FIG. 10 shows in greater detail the connecting link shown in FIG. 9.

FIG. 10 shows in greater detail a side view of the connecting link 114 shown in FIG. 9, with the helical torsion spring 152 being operative in relation to pivot 124 for centering the position of the collector shoe 76.

What is claimed is:

1. In power collection apparatus for a vehicle having an electrical load and movable along a support track having at least one electrically energized power rail extending substantially in parallel with said support track, the combination of:
    means carried by said vehicle and electrically coupled with said one power rail for collecting power to energize said vehicle load,
    means connected between the vehicle and said power collecting means for enabling the power collecting means to maintain an electrical coupling with different positions of said one power rail as the vehicle moves along the support track, with said enabling means including first support means to control the collecting means to follow vertical position changes of the one power rail in relation to said vehicle and along a first axis of movement, including second support means controlling the collecting means to follow horizontal position changes of the one power rail in relation to said vehicle and along a second axis of movement substantially perpendicular with said track, and including third support means to control the collecting means to follow horizontal position changes of the one power rail in relation to said vehicle and along a third axis of movement substantially parallel with said track, and
    with said third support means providing one of a normal position and a restrained position for the power collecting means, such that the power collecting means in the restrained position is moved along said third axis of movement in relation to said vehicle.

2. The power collection apparatus of claim 1, with said second support means including a connecting link that is extendable by a first spring member, with the third support means including a pivot connection operative with the connecting link and having a second spring member for determining said normal position of said connecting link and permitting movement of the collecting means into said restrained position along said third axis.

3. The power collection apparatus of claim 1,
    with said enabling means permitting movement of the collecting means along said power rail in a dragging mode of operation such that the collecting means is in said restrained position in a direction opposite to the movement direction of the collecting means along said power rail.

4. The power collection apparatus of claim 1,
    with the collecting means having a normal support position provided by the enabling means, and
    with the collecting means moving in relation to said normal position as the collecting means moves along the power rail such that the collecting means is in said restrained position and operative in a dragging mode along the power rail.

* * * * *